Aug. 8, 1950    R. GOLDBERG    2,518,305
THERMAL FUEL EXPANSION UNIT
Filed July 8, 1946    2 Sheets-Sheet 1
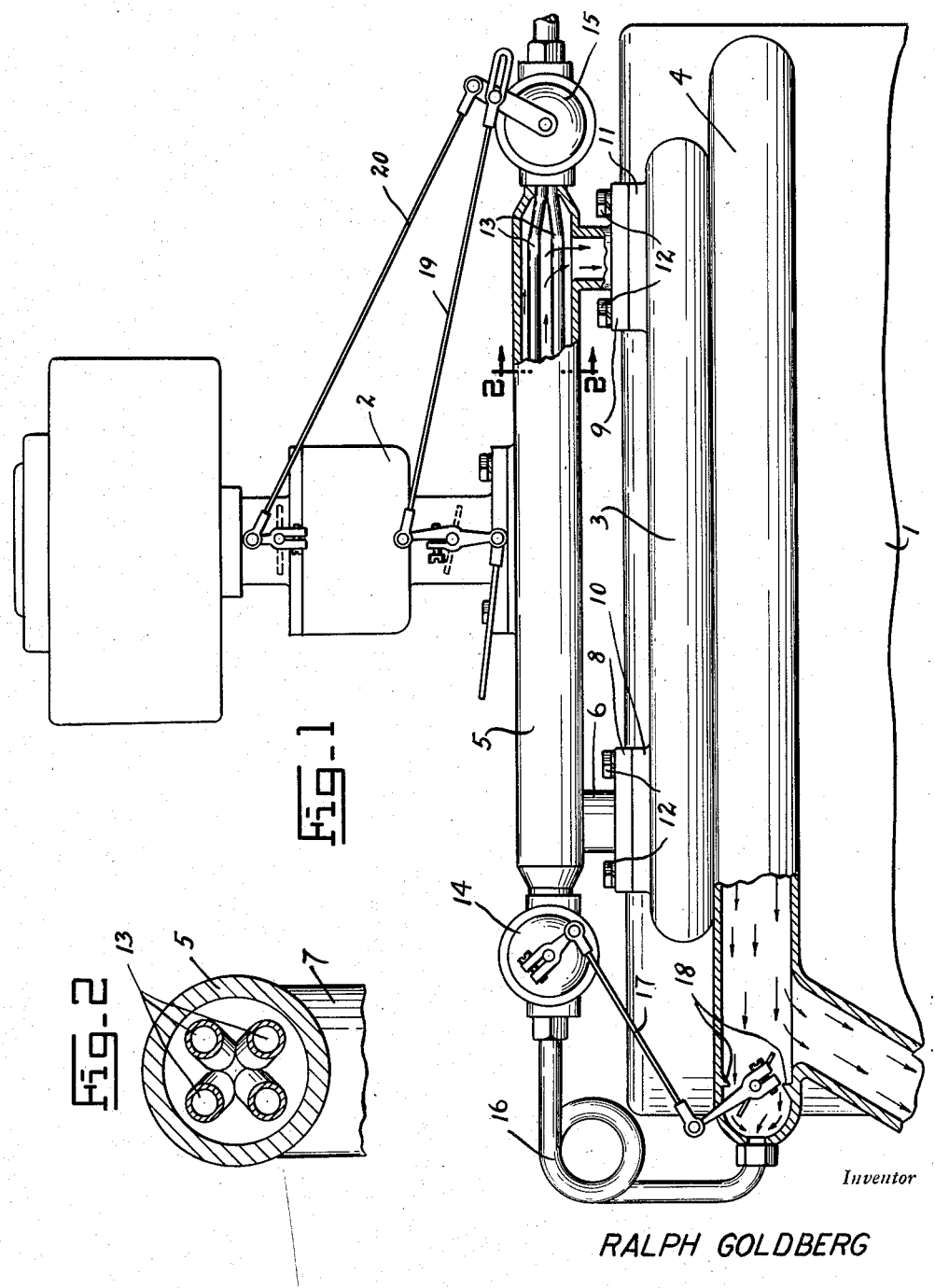
Inventor
RALPH GOLDBERG Aug. 8, 1950 — R. GOLDBERG — 2,518,305
THERMAL FUEL EXPANSION UNIT
Filed July 8, 1946 — 2 Sheets-Sheet 2
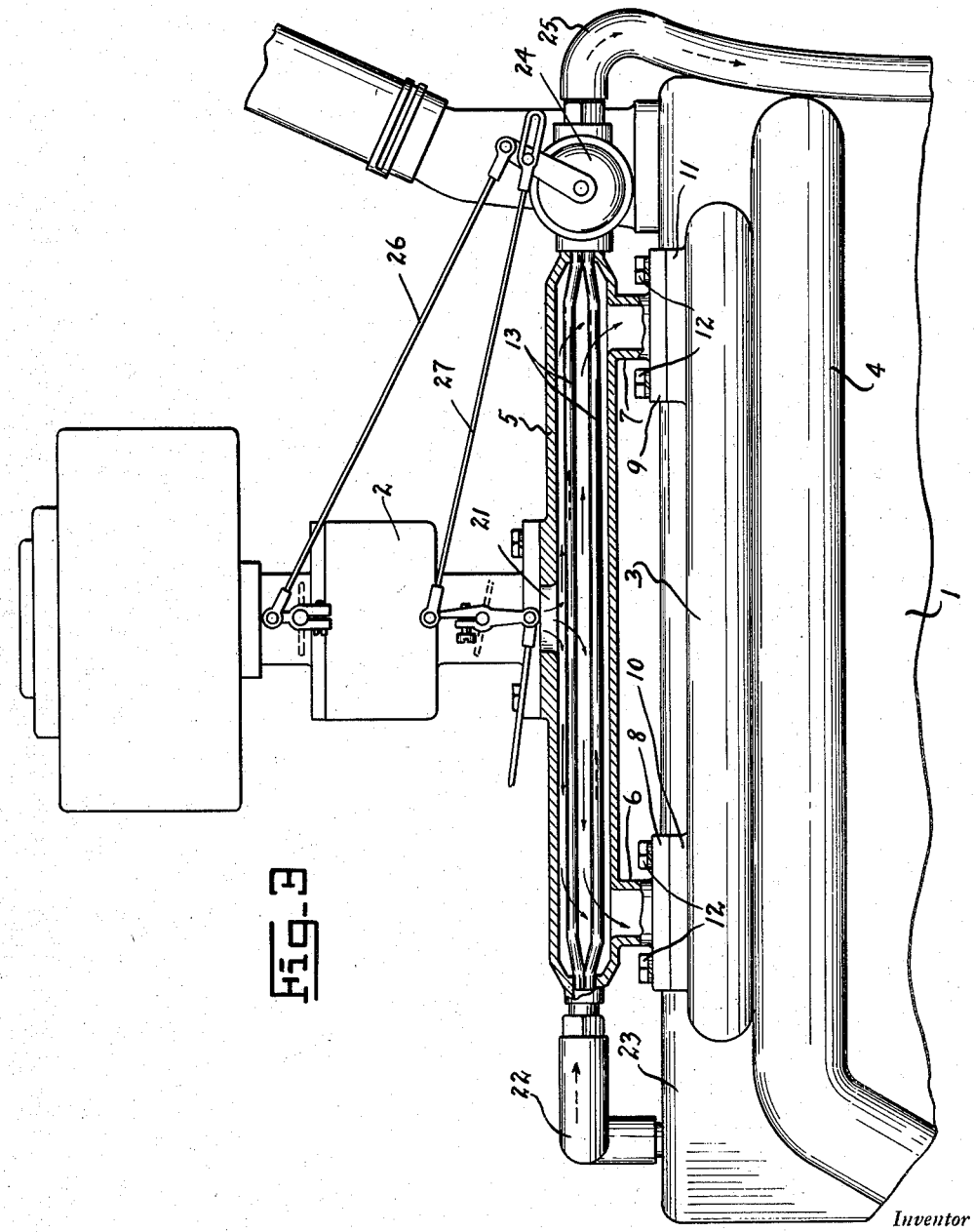
Inventor
RALPH GOLDBERG Patented Aug. 8, 1950

2,518,305

UNITED STATES PATENT OFFICE 2,518,305

THERMAL FUEL EXPANSION UNIT

Ralph Goldberg, Baltimore, Md., assignor of one-third to Joseph H. Colvin, Baltimore, Md.

Application July 8, 1946, Serial No. 682,022

1 Claim. (Cl. 123—122)

This invention relates to improvements in thermal fuel expansion units.

An object of the invention is to provide an improved thermal fuel expansion unit for positioning upon an internal combustion engine to be connected between the carburetor and the intake manifold of the engine, and to be provided with a plurality of longitudinally arranged tubes extending through the unit and connected to bypass the heated exhaust gases therethrough to heat and expand the fuel charge immediately before it enters the intake manifold and engine cylinders to be ignited and exploded therein.

A further object of the invention is to provide an improved thermal fuel expansion unit for internal combustion engines which will be disposed between the carburetor and the intake manifold of the engine, and to include a plurality of longitudinally extending tubes extending through the unit to be connected in the water cooling circuit for the engine, whereby the fuel charge from the carburetor will be heated and expanded prior to entering the intake manifold of the engine.

Another object of the invention is to provide an improved thermal fuel expansion unit for an internal combustion engine which will be disposed between the carburetor and the intake manifold of the engine, and having means connectible with either the exhaust manifold or the water cooling system for preheating the fuel charge from the carburetor prior to its entering the intake manifold, said unit being highly efficient in operation, and relatively inexpensive to manufacture and produce.

Other objects will appear as the description proceeds.

In the accompanying drawings which form a part of this application,

Figure 1 is a side elevation of the improved unit shown connected with the exhaust manifold of an internal combustion engine and partly broken away to show the interior mechanism thereof;

Figure 2 is a transverse sectional view taken on the line 2—2 of Figure 1, and

Figure 3 is a side elevation of an internal combustion engine, showing the improved unit in section and connected with the water cooling system of the engine.

Like characters of reference are used throughout the following specification and the accompanying drawings to designate corresponding parts.

In carrying out the invention, there is provided an internal combustion engine generally denoted by the reference numeral 1 having a carburetor 2, an intake manifold 3, and an exhaust manifold 4.

The mechanisms illustrated in Figures 1 and 3 show similarly constructed thermal fuel expansion units, the only difference being that in Figure 1 the unit is connected with the exhaust manifold of the engine, whereas in Figure 3 the unit is connected with the engine water cooling system.

By referring to Figure 1 of the drawings, it will be seen that the unit includes an elongated tubular body 5 having depending branches 6 and 7 spaced from each other and formed with the flanges 8 and 9 which will seat on similarly shaped flanges 10 and 11 on the intake manifold 3, and will be held in fixed position thereon by means of the bolts 12. The opposite ends of the tubular unit body 5 will be restricted and will support the four longitudinally extending tubes 13 through which the exhaust gases will pass.

Secured to one end of the body 5 at the restricted portion is a pipe 16 which communciates with the inner longitudinal tubes 13. The other end of the pipe 16 is suitably connected to and communicates with the exhaust manifold 4. In the restricted portion of the body 5 between the pipe 16 and the longitudinal tubes 13 is a thermostat 14 which is pivotally connected by a link 17 to a valve in the exhaust manifold adjacent the pipe 16 which cooperates with seats 18 carried by the exhaust manifold. Thus, when hot exhaust gases pass from the pipe 16 to the tubes 13, the thermostat 14 will be actuated in such manner that the valve in the exhaust manifold will be urged toward the seats 18, closing off the supply of exhaust gas. As the body 5 and the motor cool, the thermostat 14 will actuate the link 17 to cause the valve to move away from the seat 18, allowing hot exhaust gases to pass through the pipe 16 and eventually through the tubes 13.

In the restricted portion of the body 5 and at the end opposite the thermostat 14 another thermostat 15 is provided which is operatively and pivotally connected to the throttle and the choke by means of links 19 and 20 respectively. Thus, when the hot exhaust gases leave the body 5 through the pipes 13, the thermostat 15 will actuate the link 20 opening the choke to allow a leaner gas-air mixture to enter the body 5. When the body 5 and motor cool off, the thermostat 15 will actuate link 20 to close the choke and allow the entry of a richer gas-air mixture.

In conventional automotive vehicles, the throttle is spring urged into a closed position. Upon starting the vehicle and when it is cold, the thermostat is actuated so that the links 19 and 20 and the arm connecting the link 20 to the thermostat 15 are in their extreme clockwise position or to the right of Figure 1. It will be noted that there is a pin carried by the arm connecting to the link 20 which extends through the slot at the end of the link 19. When the extreme clockwise position is obtained, this pin engages the extreme end of the slot and keeps the throttle cracked in an open position against the action of the spring and also maintains the choke in a closed position. Thus when the motor is cold, a rich fuel-air mixture is entering the motor through the carburetor while the throttle is cracked so that the motor will race.

As the motor warms up the exhaust gases passing through the tubes 13 will actuate the thermostat 15 in such a manner that the arm connected to the link 20 will move in a counterclockwise direction and the choke plate will slowly open to allow a leaner mixture of fuel-air to enter the motor through the carburetor. Because of the direct connection of the link 20 to the thermostat via the arm, the opening or tilting of the choke plate will be gradual and will depend upon the extent to which the motor is warmed up. On the other hand, when the motor is warming up, it is unnecessary for the motor to race and for the throttle to remain in an open position. Therefore, as the arm connecting the thermostat 15 to the link 20 is moved in a counterclockwise direction, the pin carried by the arm becomes disengaged from the right end of the slot and the spring associated with the throttle quickly and rapidly pulls the throttle closed immediately even though the link 20 and the arm themselves are moving at a slower rate counterclockwise to open the choke plate gradually.

In Figure 3 of the drawings, the same form of unit 5 is employed having the same connections to the intake manifold 3 of the engine 1, as illustrated and described in connection with Figure 1. The inlet connection 21 for the unit 5 will be located centrally of the unit and will support the carburetor 2, as clearly illustrated. Similarly formed tubes 13 will extend longitudinally through the unit 5, and will be connected to the water cooling system of the engine. A coupling 22 will be connected at the rear end of the unit 5 to the water jacket in the cylinder head 23, while the thermostat 24 will be connected at the forward end of the unit 5 to be connected through the hose 25 to the radiator (not shown). The thermostat 24 is pivotally and operatively connected to the choke and throttle by means of links 26 and 27 respectively. The thermostat 24 and associated links 26 and 27 operate in the same manner as the thermostat 15 described hereinabove relative to Figure 1.

The action is that of a heat exchange principle whereby the heated exhausted gases or the heated water in the water cooling system will be passed through the tubes extending through the unit, whereby the fuel charge passing over the surfaces of the heated tubes will be heated and expanded to provide a more efficient operation of the engine.

From the foregoing description, it will be apparent that there has been devised a highly efficient and economical form of thermal fuel expansion unit which will be used in connection with an internal combustion engine, to be connected either with the exhaust manifold thereof, or with the water cooling system, whereby the fuel charges passing from the carburetor to the intake manifold of the engine will be heated and expanded to provide more perfect combustion and better operation of the engine.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

In combination with an internal combustion engine including a carburetor having a choke valve, an intake manifold and a water cooling jacket; a fuel mixture pre-heater interposed between the carburetor and the manifold; a plurality of tubes disposed in the pre-heater for conveying water therethrough; inlet and outlet conduits connecting said tubes to the water-cooling jacket; a thermostat in said outlet conduit; and means operatively connecting said thermostat to the choke valve for opening the choke valve as the engine warms up.

RALPH GOLDBERG.

REFERENCES CITED

The following references are of record in the file of this patent:

UNITED STATES PATENTS

| Number | Name | Date |
|---|---|---|
| 1,576,304 | Smith | Dec. 29, 1925 |
| 1,889,270 | Thomas et al. | Nov. 29, 1932 |
| 2,139,356 | Coffey | Dec. 6, 1938 |

FOREIGN PATENTS

| Number | Country | Date |
|---|---|---|
| 41,552 | France | Feb. 7, 1933 |

(Addition to No. 685,681)